United States Patent [19]
DeMoney

[11] Patent Number: 6,064,379
[45] Date of Patent: *May 16, 2000

[54] SYSTEM AND METHOD FOR SYNCHRONIZING PRESENTATION OF MEDIA STREAM PLAYLISTS WITH REAL TIME

[75] Inventor: Michael A. DeMoney, Los Gatos, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/669,018

[22] Filed: Jun. 24, 1996

[51] Int. Cl.$^7$ ........................................... G06F 13/00
[52] U.S. Cl. .......................................... 345/328; 707/501
[58] Field of Search .................................. 345/302, 328; 707/501

[56] References Cited

U.S. PATENT DOCUMENTS

| | | | |
|---|---|---|---|
| 5,420,801 | 5/1995 | Dockter et al. | 345/302 |
| 5,515,490 | 5/1996 | Buchanan et al. | 345/302 |
| 5,553,222 | 9/1996 | Milne et al. | 345/302 |
| 5,559,949 | 9/1996 | Reimer et al. | 345/327 |
| 5,608,651 | 3/1997 | Leavy et al. | 364/514 |
| 5,642,497 | 6/1997 | Crary et al. | 345/302 |
| 5,661,665 | 8/1997 | Glass et al. | 348/423 |

*Primary Examiner*—Mark R. Powell
*Assistant Examiner*—Huedung X. Cao
*Attorney, Agent, or Firm*—Conley, Rose & Tayon, P.C.; Robert C. Kowert; B. Noel Kivlin

[57] ABSTRACT

A multimedia server system includes a disk array subsystem including a plurality of multimedia files, e.g., movies, a media file system manager for managing the storage of the plurality of multimedia files within the disk array subsystem, and a playlist which includes a list of titles of specific multimedia files to be played at designated times. The multimedia server system advantageously includes synchronization parameters associated with each of titles specified by the playlist. The synchronization parameters are programmed to specify the manner in which particular files should be truncated in order to compensate for admission delays. An admission delay synchronization unit receives the synchronization parameters and truncates the multimedia files as specified by the synchronization parameters. In one implementation, a first synchronization parameter is used to specify that the current file should be truncated at the time for the play of the next file. A second synchronization parameter specifies that up to a given amount of time should be sacrificed at the beginning of the next file to account for the admission delay of the current file. In this manner, the beginning of the next file is truncated. Still a third synchronization parameter is provided to specify an amount of time up to which the current file will be truncated at it's end to account for it's admission delay. As a result, the truncated file can be played in a shorter amount of time than the scheduled duration, and the "excess time" created is available to absorb any admission delay.

38 Claims, 4 Drawing Sheets

| Playlist 26 | | Synchronization Parameters 30 | | |
|---|---|---|---|---|
| Title | Item Duration | Is Time Locked | Join In Duration | Play Duration |
| Movie #1 | 1 Hr 30 Min | True | 0 Seconds | 1 Hr 30 Min |
| Movie #2 | 1 Hr 30 Min | False | 0 Seconds | 1 Hr 29 Min 59Sec |
| Movie #3 | 1 Hr | False | 0 Seconds | 1 Hr |
| Movie #4 | 1 Hr 30 Min | False | 2 Seconds | 1 Hr 30 Min |

FIG. 2

SYSTEM AND METHOD FOR SYNCHRONIZING PRESENTATION OF MEDIA STREAM PLAYLISTS WITH REAL TIME

BACKGROUND OF THE INVENTION

1. Field of the Invention

This invention relates to multimedia server systems and more particularly to the synchronization of media stream playlists with real time i.e., actual clock time, in a video server environment.

2. Description of the Related Art

Media servers provide cost-effective video, audio, and other multimedia stream capabilities for use in both business and consumer environments. For example, a video server may include a library of video sources such as movies from video, and permit one or more users to select one or more of the movies for viewing. The video server typically includes magnetic storage hard disk drives on which recorded blocks from the user-selected video sources are magnetically stored. Movies typically are two hours long, and are encoded (e.g., using MPEG) at a rate of between perhaps one Mb/second and about eight Mb/second. Thus, one movie may require one GB to eight GB of storage media.

An admission arbiter unit is typically provided to limit the overall number of users of the video server at a given time and to prevent overloading of the network or disk storage system. Such overload could cause movies to run too slowly or to move forward (or backward) in a jerky manner. The time at which a particular movie should be played and the order at which movies are played is controlled by a playlist. A playlist is a contiguous list of multimedia titles placed at a particular position upon the playlist timeline. Each title has a specified duration. Once a command to play the playlist is given, the play should advance along the playlist timeline in equal measure with the time of day.

It is often impractical to store an entire movie in a single hard disk unit since a typical hard disk unit can only output data at a rate of a few Mb/second. To circumvent this storage problem, it is common to store blocks of the movie (e.g., perhaps 0.5 second sequences) across multiple hard disk units. These blocks are then read out or transferred to a buffer, and communicated over the network. As these blocks are sent over the network, new blocks from the movie are read out from the hard disk unit. At the receiving end, the blocks are decoded for user viewing on a video monitor, television receiver or the like.

The use of hard disk drives to store information magnetically is well known. A single hard disk drive typically includes several rotating disks or platters upon whose surfaces information may be written or read by a read/write head. Within a hard disk drive, the platters rotate together, and all read/write heads typically are moved simultaneously to access different platter positions. A platter typically is formatted into concentric tracks that define collectively, platter-to-platter, a family of concentric cylinders, and into sectors that represent a portion of a track. A controller associated with the hard disk unit determines which cylinder, read/write head and sector is to be accessed for reading or writing.

The platters may also be considered as being divided into zones. Since they are physically larger, tracks in zones at the outer platter perimeter contain more sectors than tracks in zones nearer the rotational axis of the platter. Therefore, assuming that the platters rotate with a constant velocity w, the data bandwidth available from the outermost zones is greater than the data bandwidth available from the innermost zones. Even with modern hard disk drives, there can be a 2:1 variation between worst case and average case disk transfer bandwidth, due to sectors/track variations between outer and inner zones.

Unfortunately, providing a video bit stream from the output of a video server at the exact time specified by the playlist is difficult due to the delays inherent in multimedia players, which is a property of the disk access times and other delays associated with the multimedia server. The delay between the time when the play of a particular title on the playlist is commanded and the actual initiation of play is referred to as "admission delay".

The length of an admission delay is in general not of predictable duration. The duration of any particular admission delay is a property of the current load on the multimedia server and the specific timing relationship of the request to initiate play with respect to the position of the first requested data block within the disk array containing the multimedia stream. As a result, the exact time at which the video bit stream will be provided from the multimedia server will become offset with respect to real time. As a day progresses, the offset between the playlist and real time may increase due to the accumulating admission delays of the movies within the playlist.

Hence, a system and method would be desirable to synchronize the presentation of media stream playlists with real time, and to allow a system operator to flexibly specify the manner in which admission delays are accounted for.

SUMMARY OF THE INVENTION

The problems outlined above are in large part solved by a system and method for synchronizing presentation of media streams, e.g. movies, with real time in accordance with the present invention. In one embodiment, a multimedia server system includes a disk array subsystem including a plurality of multimedia files, a media file system manager for managing the storage of the plurality of multimedia files within the disk array subsystem, and a playlist which includes a list of items (identifiers) corresponding to a specific subset of the multimedia files to be played at designated times. The multimedia server system advantageously includes synchronization parameters associated with each of the items specified by the playlist. The synchronization parameters, which are programmed by a system operator or an end user, specify the manner in which multimedia files corresponding to each item in the playlist should be truncated in order to compensate for admission delays.

An admission delay synchronization unit receives the synchronization parameters and truncates the multimedia files as specified by the synchronization parameters. In one implementation, a first synchronization parameter is used to specify that the current multimedia file should be truncated at the time for the play of the next multimedia file. A second synchronization parameter is provided to specify that up to a given amount of time should be sacrificed at the beginning of the next multimedia file to account for the admission delay of the current multimedia file. In this manner, the beginning of the next multimedia file is truncated.

A third synchronization parameter is provided to specify an amount of time up to which the current multimedia file can be truncated (at its end) to account for any admission delay. In other words, by permitting the actual play duration ("played duration") of each multimedia file to be shorter than scheduled allocation of play time for the multimedia file, the difference between the scheduled and played durations, i.e., the "excess time", can be used to absorb any admission delays, thereby avoiding the problems associated with accumulative admission delays over a period of time.

As a result, the multimedia server system advantageously allows the synchronization of the presentation of media streams with real time over the period of time by allowing a system operator to flexibly absorb any admission delays.

DESCRIPTION OF THE DRAWINGS

Other objects and advantages of the invention will become apparent upon reading the following detailed description and upon reference to the accompanying drawings in which:

FIG. 2 is a diagram that illustrates an exemplary listing of multimedia titles specified by a user and exemplary associated synchronization parameters.

Figure 1:
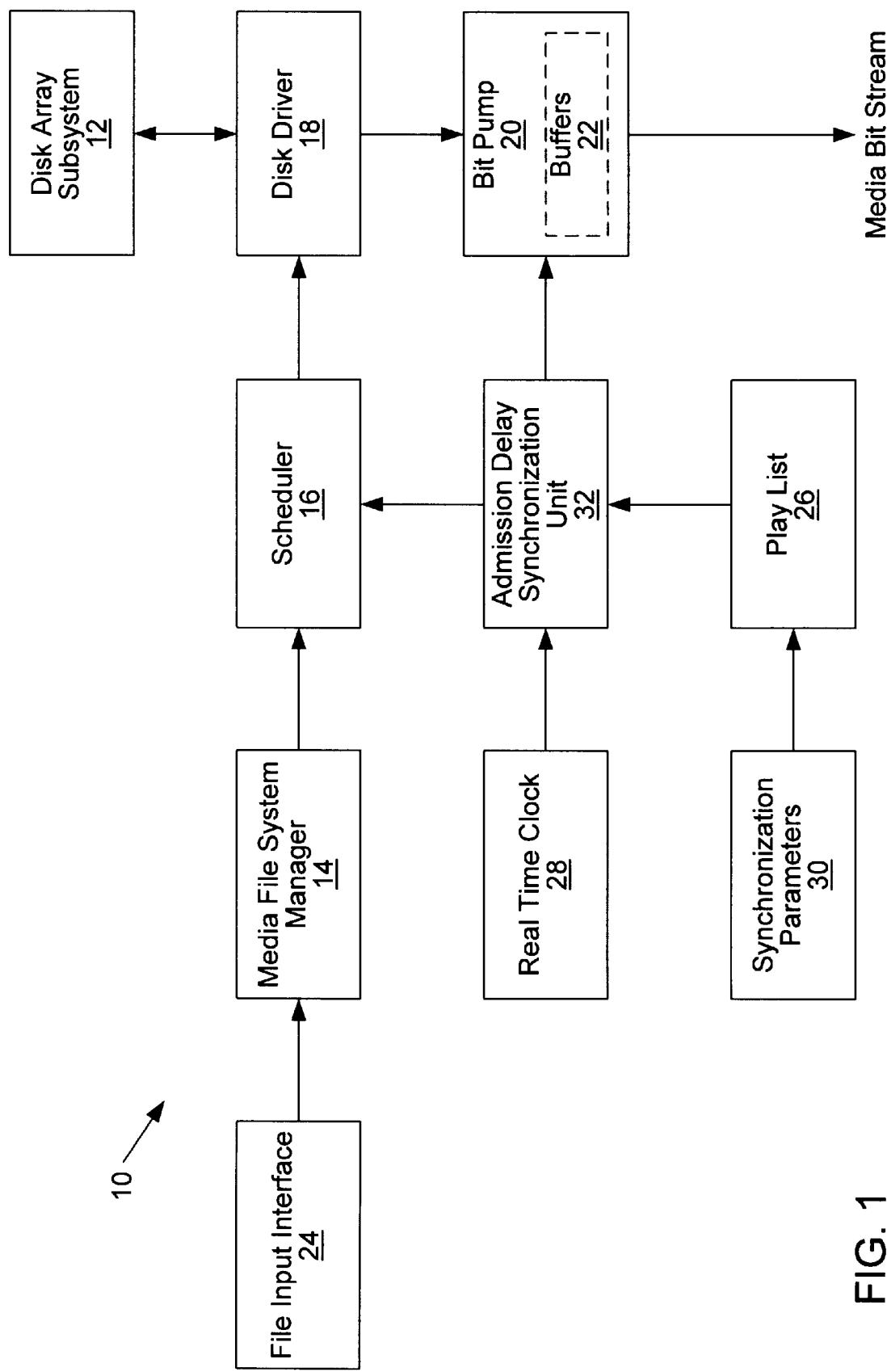
FIG. 1 is a functional block diagram of a multimedia server system in accordance with one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF THE PREFERRED EMBODIMENT(S)

Turning now to FIG. 1, a functional block diagram is shown of a multimedia server system in accordance with one embodiment of the present invention. As will be explained in further detail below, several of the functional blocks depicted in FIG. 1 may be implemented in software.

The multimedia server system 10 of FIG. 1 includes a disk array subsystem 12 which may comprise one or more magnetic disk drives that store video. Video files stored by disk array subsystem are managed by a media file system manager 14. More specifically, media file system manager 14 allows specified files to be output from multimedia server system 10 by scheduling accesses to disk array subsystem 12 via a scheduler 16 and disk driver 18. A multimedia bit stream is output from multimedia server subsystem 10 through a bit pump unit 20 including buffers 22 which temporarily store data accessed from disk array subsystem 12 in response to commands from disk driver 18. The output of bit pump 20 is a bit stream of encoded video (and audio, if present) information. For example, the output of bit pump 20 may be encoded in an MPEG (Motion Picture Experts Group) format.

New video files may be stored within disk array subsystem 12 via a file input interface 24. The storage of files within disk array subsystem 12 is managed by media file system manager 14.

It is noted that file input interface 24 may communicate with media file system manager 14 through an application programming interface (API). It is further noted that media file system manager 14, scheduler 16, disk driver 18, file input interface 24, and/or playlist 26 may be implemented either partially or wholly in software, and that one or more microprocessors may be employed as a portion of the hardware forming multimedia server subsystem 10 to control the functionality of these blocks.

It is further noted that the above described features of multimedia server subsystem 10 are conventional, and that a variety of other specific implementations of a multimedia server system are also possible that employ the system and method for synchronizing the presentation of media stream playlists with real time in accordance with the following description and appended claims.

The functional block diagram of multimedia server system 10 as illustrated in FIG. 1 also depicts synchronization parameters 30 which are associated with a playlist 26. Playlist 26 is also shown coupled to an admission delay synchronization unit 32. More specifically, synchronization parameters 30 allow a user to specify the manner in which multimedia server system 10 synchronizes the output of multimedia as specified by playlist 26 with real time.

FIG. 1 finally illustrates an admission delay synchronization unit 32 which receives the synchronization parameters 30 and playlist 26, and controls the synchronization of the video output from multimedia server system 10 accordingly. Playlist 26 includes commands that specify what files are to play and at what time the specified files should play. Admission delay synchronization unit 32 uses this information, along with the current time of day ("real time") as indicated by real time clock 28, to provide output requests to disk array subsystem 12 via scheduler 16.

The specific manner in which admission delay synchronization unit 32 synchronizes playlist 26 depends upon synchronization parameters 30. Details regarding further aspects of synchronization parameters 30 and admission delay synchronization unit 32 will be provided below in conjunction with the description of FIGS. 2–4. It is noted that, similar to several of the other functional blocks of FIG. 1, synchronization parameters 30 and admission delay synchronization unit 32 may be partially or wholly implemented in software.

FIG. 2 illustrates playlist 26 including an exemplary listing of multimedia titles with itemDurations as scheduled by a user to be output from multimedia server system 10 in the specified sequence. Associated with each listed movie is an amount of real time (clock time) allocated for playing each movie, called the "item Duration".

In addition, FIG. 2 further illustrates synchronization parameters 30 which includes a set of synchronization parameters associated with each movie on playlist 26. Each set of parameters include a parameter "isTimeLocked", a parameter "joinInDuration", and a parameter "playDuration". As stated previously, synchronization parameters 30 are used by synchronization unit 32 to maintain the given itemDuration for each movie, given the expectation that perturbations of playtime are introduced by admission delay.

Figure 3:
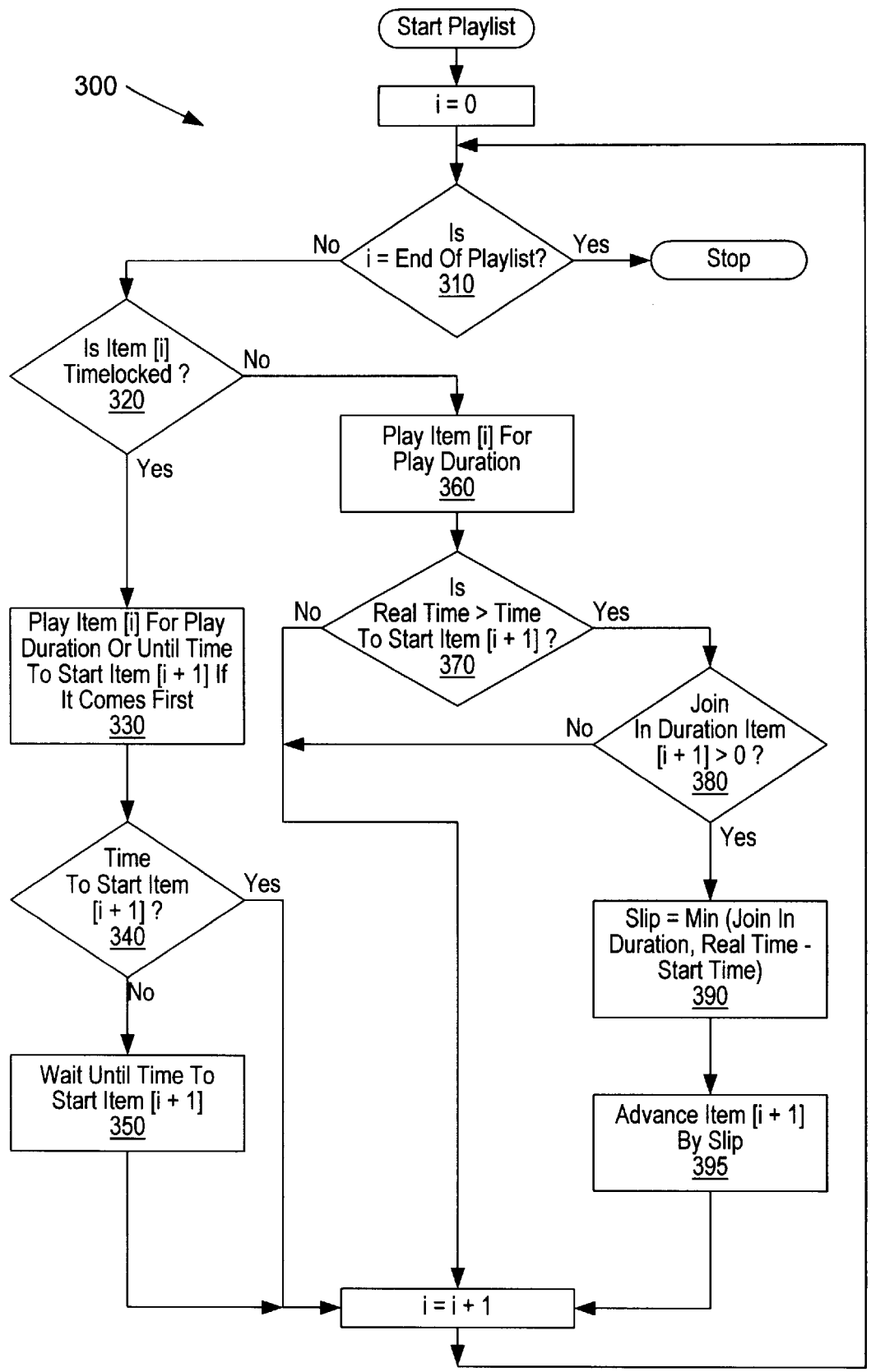
FIG. 3 is a flow diagram which depicts the operation of an admission delay synchronization unit.

FIG. 3 is a flow diagram which depicts the operation of admission delay synchronization unit 32. In the following description, depending on the context, an "item" refers to either an identifier of a media stream or to the content of the media stream. Time synchronized play of playlist 26 is initiated by issuing a command to synchronization unit 32 directing unit 32 to begin play of the playlist 26 at a particular point in real time by referencing real time clock 28. For example, assume that synchronization unit 32 is commanded to begin playlist 26 at 1:00 hours (real time). Given the itemDurations shown in FIG. 2, ideally movie #1 should begin at 1:00, movie #2 should begin 1 hour and 30 minutes afterwards, i.e., at 2:30, movie #3 should begin at 1 hour and 30 minutes after the start of movie #2, i.e., at 4:00, and so on.

Synchronization unit 32 ensures that itemDurations specified within playlist 26 are maintained in synchronization with the real time schedule as dictated by playlist 26. As such, whenever admission delay induced itemDuration deviations from real time schedule are detected by synchronization unit 32, unit 32 regains synchronization with the real time schedule as directed by synchronization parameters 30.

Hence, for each item in playlist 26 (step 310), the following exemplary steps are performed. As each item from playlist 26 is accessed within disk array subsystem 12 via scheduler 16 and disk driver 18, admission delay synchronization unit 32 detects the associated synchronization parameters for that item.

If the flag "isTimeLocked" is True for an item on playlist 26 (step 320), the item is played until it expires, or until it is time to start the next item if the next item is scheduled to begin before the end of the current item (step 330). In other words, time synchronization can be regained by truncating the play of the current item at the time of day at which the next item should be initiated, regardless of the fact that admission delays may have delayed the initiation of play of the current item and thus the current title may not have completely played. If the current item expires before the scheduled start time of the next item, then synchronization unit 32 waits for the scheduled start time of the next item (steps 340, 350).

Conversely, if "isTimeLocked" is False (step 320), then synchronization unit 32 begins playing the current item for the play duration (step 360). If at completion of current item play the real time is greater than the scheduled start time of the next item and the next item has a non-zero "joinInDuration", then the start time of the next item is allowed to slip, i.e., to be advanced, by the lessor of either the "joinInDuration" of the next item or the difference between the real time and the start time of the next item (steps 390, 395). As such, up to "joinInDuration" of the beginning of the next item is "sacrificed" (i.e., truncated) to allow the current item to play to completion. The next item will begin play at a position equivalent to the admission delay of the current item.

The parameter "playDuration" allows the system operator to specify an alternate play duration less than the full duration of the item's entry in playlist 26. The purpose of including the parameter "playDuration" is to allow more time to be allocated than is actually needed for an item to play. This extra time can then be used to absorb any admission delays. This parameter may be specified in conjunction with the other two parameters.

Hence, if none of these parameters are specified, or the "joinInDuration" or "playDuration" parameter values were insufficient to fully correct for the admission delay, then playlist 26 will "slip" with respect to the time of day by the accumulation of admission delays as each item in playlist 26 is initiated. System 10 further allows that these accumulating delays be addressed by synchronization parameters associated with a later item in playlist 26.

Figure 4:
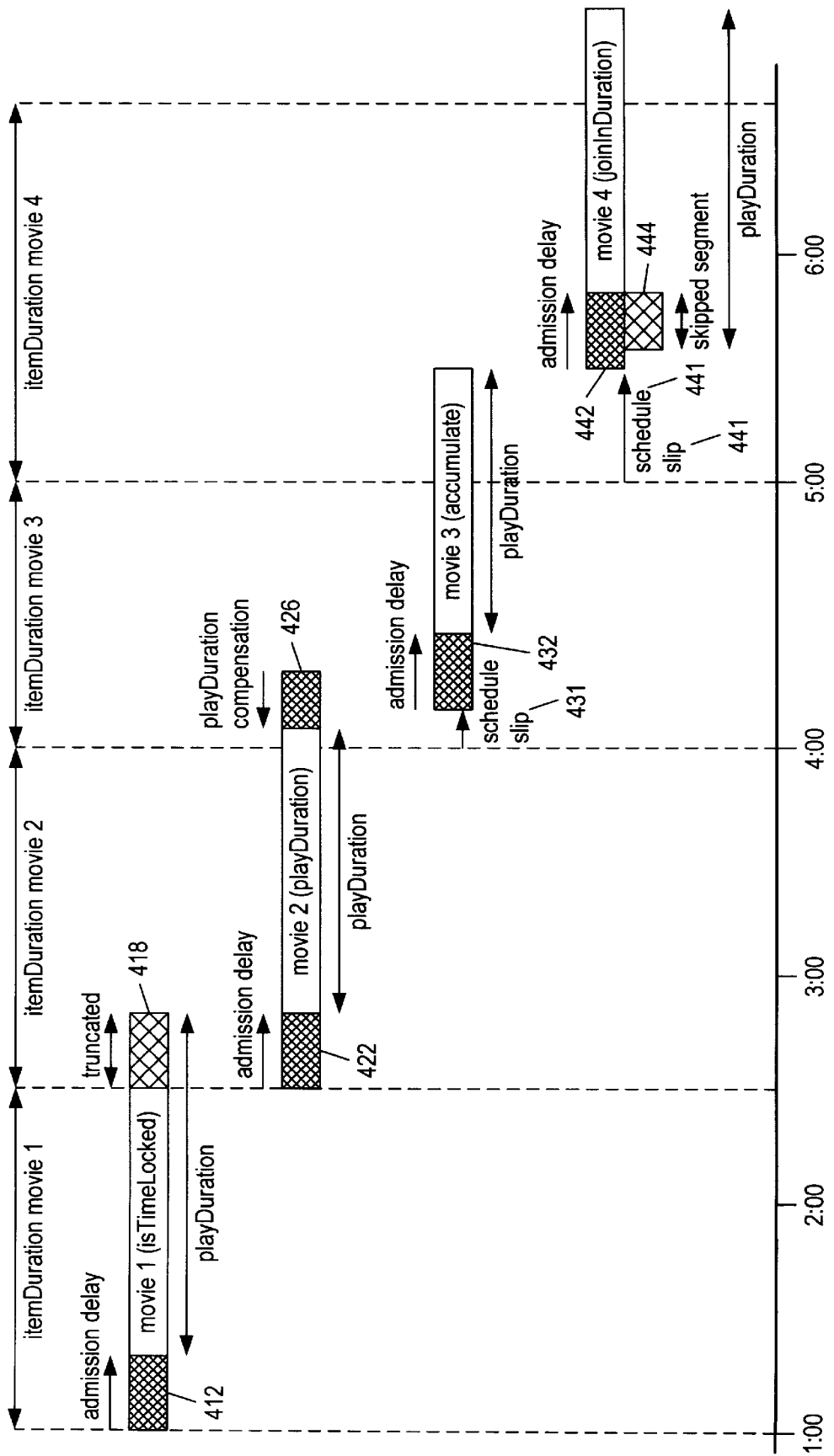
FIG. 4 is a diagram which illustrates the synchronization of items specified by a playlist with real time.

FIG. 4 is a diagram which illustrates the synchronization of items specified by playlist 26 and real time. Movie #1 is specified to start at one o'clock (1:00). However, because an admission delay 412, the actual start of movie #1 is delayed and hence the expected completion of movie #1 will extend beyond the time period as allocated by itemDuration.

Since movie #1 has "isTimeLocked" set, an end portion 418 of movie #1 will be truncated at 2:30 which is the scheduled start time for movie #2. Accordingly, synchronization unit 32 is commanded to begin playing movie #2 after movie #1 has been truncated. However, movie #2 is also subject to an admission delay 422. In this example, since the specified playDuration of movie #2 is less than the full itemDuration of movie #2, any schedule slip caused by admission delay 422 can be reduced by the difference.

According to playlist 26, movie #3 is scheduled to begin play after movie #2 completes. However, the actual start time may be earlier or later than the scheduled start time depending on whether the difference between playDuration and itemDuration of movie #3 is greater or less than admission delay 432. Although movie #3 is initiated immediately upon the completion of movie #2, movie #3 is not timeLocked, has a zero joinInDuration, and has a playDuration identical to its itemDuration. As such, any schedule deviation at the end of movie #2 is accumulated with admission delay 432 of movie #3 resulting in a schedule slip 431, i.e., no explicit resynchronization occurs.

Upon the completion of movie #3, movie #4 is initiated. Note that a schedule slip 441 has already occurred. Movie #4 specifies a joinInDuration. Hence, any accumulated schedule slip beyond slip 441, up to the value of joinInDuration, will be compensated for at this point in time by initiating actual play of movie #4 at an offset from its beginning defined by a skipped segment 444.

It is noted that combinations of synchronization parameters 30 as described above may be specified for a particular item. In this manner, a particular item may be truncated at both its beginning and its end, depending upon the parameter(s) specified.

The system and method as described above for synchronizing items specified by a playlist with real time advantageously prevents the accumulation of admission delays as playlist items are played. The system and method further allows the system operator to flexibly allocate differing truncation techniques for differing items, depending upon the importance of the beginning and/or end of a particular item.

Server systems and subsystems incorporating features of the present invention can be implemented entirely in hardware, or in a combination of hardware and software (i.e. program modules stored in memory). For example, the admission delay synchronization unit and playlist can be implemented entirely in software. Suitable media for server software include, for example, magnetic media (e.g. disks and tapes), optical media (e.g. CD-ROMs), EPROM, DRAMs and SRAMs. In addition, software can either be pre-loaded into the server system or loaded by the user electronically with or without the use of tangible storage media, e.g. by downloading program modules to the user's server from ftp/telnet or html sites on the Internet or World-Wide Web, respectively.

Thus, program modules incorporating features of the invention can be conveniently distributed by CD-ROM, for example, or by accessing a Web site. In the latter case, the modules are typically loaded temporarily from permanent storage into RAM and/or output buffers of the Web server; i.e., these are the media serving to store and distribute the program modules of the invention whenever a download request is made. After loading into-RAM, the Web server transmits the program modules to the user's host.

Numerous variations and modifications will become apparent to those skilled in the art once the above disclosure is fully appreciated. It is intended that the following claims be interpreted to embrace all such variations and modifications.

What is claimed is:

1. A method for synchronizing media streams with real time, comprising:

creating a playlist specifying a sequence of media stream items to be played one after another;

for each media stream item, specifying a first synchronization parameter value; and playing one of said media stream items;

wherein if said first synchronization parameter value is set to a first state, a current media stream item is played for a specified duration; and if said first synchronization parameter value is set to a second state, the current media stream item is played for the lesser of the specified duration or until a time corresponding to the start of a next media stream item.

2. The method as recited in claim 1, further comprising:

for each media stream item, specifying a second synchronization parameter value indicating a maximum truncation time; and wherein the beginning of the current media stream item is truncated by the lesser of the corresponding said second synchronization parameter value or the difference between the actual start time and a scheduled start time for the current media stream item.

3. The method as recited in claim 1, further comprising:

for each media stream item, specifying a third synchronization parameter value; and wherein the current media stream item is truncated after a play duration indicated by the corresponding said third synchronization parameter value.

4. The method as recited in claim 1, wherein the playlist further specifies for each media stream item, an amount of real time (clock time) allocated for playing said media stream item.

5. A method for synchronizing media streams with real time, comprising:

creating a playlist specifying a sequence of media stream items to be played one after another;

for each media stream item, specifying a first synchronization parameter value indicating a maximum truncation time; and playing one of said media stream items;

wherein the beginning of said current media stream item is truncated by the lesser of the corresponding said first synchronization parameter value or the difference between the actual start time and a scheduled start time for the current media stream item.

6. The method as recited in claim 5, further comprising:

for each media stream item, specifying a second synchronization parameter value; and wherein the current media stream item is truncated after a play duration indicated by the corresponding said second synchronization parameter value.

7. The method as recited in claim 5, further comprising:

for each media stream item, specifying a third synchronization parameter value; and wherein if said third synchronization parameter value is set to a first state, a current media stream item is played for a specified duration; and if said third synchronization parameter value is set to a second state, the current media stream item is played for the lesser of the specified duration or until a time corresponding to the start of a next media stream item.

8. The method as recited in claim 5, wherein the playlist further specifies for each media stream item, an amount of real time (clock time) allocated for playing said media stream item.

9. A method for synchronizing media streams with real time, comprising:

creating a playlist specifying a sequence of media stream items to be played one after another;

for each media stream item, specifying a first synchronization parameter value indicating a maximum play time; and playing one of said media stream items;

wherein the current media stream item is truncated after a play duration indicated by the corresponding first synchronization parameter value.

10. The method as recited in claim 9, further comprising:

for each media stream item, specifying a second synchronization parameter value; and wherein if the second synchronization parameter value is set to a first state, the current media stream item is played for the play duration indicated by the first synchronization parameter value; and if the second synchronization parameter value is set to a second state, the current media stream item is played for the lesser of the play duration indicated by the first synchronization parameter value or until the start of the next media stream item.

11. The method as recited in claim 10 further comprising:

for each media stream item, specifying a third synchronization parameter value indicating a maximum truncation time; and wherein the beginning of the current media stream item is truncated by the lesser of the corresponding said third synchronization parameter value or the difference between the actual start time and a scheduled start time for the current media stream item.

12. The method as recited in claim 9, wherein the playlist further specifies for each media stream item, an amount of real time (clock time) allocated for playing said media stream item.

13. A multimedia server system comprising:

a playlist configured to store a list of playlist items corresponding to a set of a plurality of media streams to be played one after another and to be initiated at designated times and further configured to specify for each media stream item, an amount of real time (clock time) allocated for playing said media stream item;

a plurality of synchronization parameters associated with each item of said list of playlist items, wherein said synchronization parameters specify a manner in which at least one of said set of media streams is adjusted to compensate for at least one admission delay of said multimedia server system; and an admission delay synchronization unit coupled to receive said synchronization parameters and to choose among a plurality of synchronization functions according to said synchronization parameters to synchronize a presentation of said multimedia streams with real time over a period of play time.

14. The multimedia server system of claim 13 further comprising a storage system configured to store a plurality of media streams and coupled to a media system manger.

15. The multimedia server system of claim 13 further comprising a real time clock coupled to said admission delay unit to provide a value indicative of real time.

16. The multimedia server system of claim 14 wherein said media system manager is configured to control access of said plurality of media streams from said storage system.

17. The multimedia server system of claim 13 wherein said synchronization parameters include a first synchronization parameter value; and wherein if said first synchronization parameter value is set to a first state, a current media stream item is played for a specified duration; and if said first synchronization parameter value is set to a second state, the current media stream item is played for the lesser of the specified duration or until a time corresponding to the start of a next media stream item.

18. The multimedia server system of claim 17 wherein said synchronization parameters further include a second synchronization parameter value indicating a maximum truncation time; and wherein the beginning of the current media stream item is truncated by the lesser of the corresponding said second synchronization parameter value or the difference between the actual start time and a scheduled start time for the current media stream item.

19. The multimedia server system of claim 17 wherein said synchronization parameters further include a third synchronization parameter value; and wherein the current media stream item is truncated after a play duration indicated by the corresponding said third synchronization parameter value.

20. The multimedia server system of claim 13 wherein said synchronization parameters include a first synchronization parameter value indicating a maximum truncation time; and wherein the beginning of said current media stream item is truncated by the lesser of the corresponding said first synchronization parameter value or the difference between the actual start time and a scheduled start time for the current media stream item.

21. The multimedia server system of claim 20 wherein said synchronization parameters further include a second synchronization parameter value; and wherein the current media stream item is truncated after a play duration indicated by the corresponding said second synchronization parameter value.

22. The multimedia server system of claim 20 wherein said synchronization parameters further include a third synchronization parameter value; and wherein if said third synchronization parameter value is set to a first state, a current media stream item is played for a specified duration; and if said third synchronization parameter value is set to a second state, the current media stream item is played for the lesser of the specified duration or until a time corresponding to the start of a next media stream item.

23. The multimedia server system of claim 13 wherein said synchronization parameters include a first synchronization parameter value indicating a maximum play time; and wherein the current media stream item is truncated after a play duration indicated by the corresponding first synchronization parameter value.

24. The multimedia server system of claim 23 wherein said synchronization parameters further include a second synchronization parameter value; and wherein if the second synchronization parameter value is set to a first state, the current media stream item is played for the play duration indicated by the first synchronization parameter value; and if the second synchronization parameter value is set to a second state, the current media stream item is played for the lesser of the play duration indicated by the first synchronization parameter value or until the start of the next media stream item.

25. The multimedia server system of claim 23 wherein said synchronization parameters further include a third synchronization parameter value indicating a maximum truncation time; and wherein the beginning of the current media stream item is truncated by the lesser of the corresponding said third synchronization parameter value or the difference between the actual start time and a scheduled start time for the current media stream item.

26. A computer-readable medium having a computer-readable medium code stored therein for synchronizing a plurality of media streams in a multimedia server system, said computer readable comprising:

a playlist configured for storing a list of playlist items corresponding to a set of a plurality of media streams to be played one after another and to be initiated at designated times and further configured for specifying for each media stream item, an amount of real time (clock time) allocated for playing said media stream item;

a plurality of synchronization parameters associated with each item of said list of playlist items, wherein said synchronization parameters specify a manner in which at least one of said set of media streams is truncated to compensate for at least one admission delay of said multimedia server system; and a code module configured to receive said synchronization parameters and to choose among a plurality of synchronization functions according to said synchronization parameters to synchronize a presentation of said multimedia streams with real time over a period of play time.

27. The computer-readable medium of claim 26 further comprises a media system manger code module configured to control access of said plurality of media streams.

28. The computer-readable medium of claim 26 wherein said multimedia server system further includes a real time clock coupled to said code module configured to receive said synchronization parameters and to choose among a plurality of synchronization functions to provide a value indicative of real time.

29. The computer-readable medium of claim 26 wherein said multimedia server system further comprising a storage system configured to store said plurality of media streams.

30. The computer-readable medium of claim 26 wherein said synchronization parameters include a first synchronization parameter value; and wherein if said first synchronization parameter value is set to a first state, a current media stream item is played for a specified duration; and if said first synchronization parameter value is set to a second state, the current media stream item is played for the lesser of the specified duration or until a time corresponding to the start of a next media stream item.

31. The computer-readable medium of claim 30 wherein said synchronization parameters further include a second synchronization parameter value indicating a maximum truncation time; and wherein the beginning of the current media stream item is truncated by the lesser of the corresponding said second synchronization parameter value or the difference between the actual start time and a scheduled start time for the current media stream item.

32. The computer-readable medium of claim 30 wherein said synchronization parameters further include a third synchronization parameter value; and wherein the current media stream item is truncated after a play duration indicated by the corresponding said third synchronization parameter value.

33. The computer-readable medium of claim 26 wherein said synchronization parameters include a first synchronization parameter value indicating a maximum truncation time; and wherein the beginning of said current media stream item is truncated by the lesser of the corresponding said first synchronization parameter value or the difference between the actual start time and a scheduled start time for the current media stream item.

34. The computer-readable medium of claim 33 wherein said synchronization parameters further include a second synchronization parameter value; and wherein the current media stream item is truncated after a play duration indicated by the corresponding said second synchronization parameter value.

35. The computer-readable medium of claim 33 wherein said synchronization parameters further include a third synchronization parameter value; and wherein if said third synchronization parameter value is set to a first state, a current media stream item is played for a specified duration; and if said third synchronization parameter value is set to a second state, the current media stream item is played for the lesser of the specified duration or until a time corresponding to the start of a next media stream item.

36. The computer-readable medium of claim 26 wherein said synchronization parameters include a first synchronization parameter value indicating a maximum play time; and wherein the current media stream item is truncated after a play duration indicated by the corresponding first synchronization parameter value.

37. The computer-readable medium of claim 36 wherein said synchronization parameters further include a second synchronization parameter value; and wherein if the second synchronization parameter value is set to a first state, the current media stream item is played for the play duration indicated by the first synchronization parameter value; and if the second synchronization parameter value is set to a second state, the current media stream item is played for the lesser of the play duration indicated by the first synchronization parameter value or until the start of the next media stream item.

38. The computer-readable medium of claim 36 wherein said synchronization parameters further include a third synchronization parameter value indicating a maximum truncation time; and wherein the beginning of the current media stream item is truncated by the lesser of the corresponding said third synchronization parameter value or the difference between the actual start time and a scheduled start time for the current media stream item.

\* \* \* \* \*

UNITED STATES PATENT AND TRADEMARK OFFICE
CERTIFICATE OF CORRECTION

PATENT NO. : 6,064,379
DATED : May 16, 2000
INVENTOR(S) : Michael A. DeMoney

Page 1 of 1

It is certified that error appears in the above-identified patent and that said Letters Patent is hereby corrected as shown below:

In the Claims:

Claim 25, column 10,
Line 8, please delete "23" and insert --24-- in place thereof.

Claim 26, column 10,
Line 18, after "readable", please delete "medium".
Line 20, please delete "computer readable" and insert --computer-readable medium-- in place thereof.

Claim 38, column 12,
Line 21, please delete "36" and insert --37-- in place thereof.

Signed and Sealed this

Thirty-first Day of July, 2001

*Attest:*

Nicholas P. Godici

NICHOLAS P. GODICI
*Attesting Officer*    *Acting Director of the United States Patent and Trademark Office*